US012581141B2

(12) United States Patent
Gaikwad et al.

(10) Patent No.: US 12,581,141 B2
(45) Date of Patent: Mar. 17, 2026

(54) SYSTEM AND METHOD FOR CUSTOMISATION OF MEDIA INFORMATION

(71) Applicant: Jio Platforms Limited, Ahmedabad (IN)

(72) Inventors: Tejas Sudam Gaikwad, Pune (IN); Bhupendra Sinha, Pune (IN); Gaurav Duggal, Hyderabad (IN); Apparao Mulpuri, Ameenpur Mandal (IN); Sameer Mehta, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/145,958

(22) Filed: Dec. 23, 2022

(65) Prior Publication Data

US 2023/0224515 A1      Jul. 13, 2023

(30) Foreign Application Priority Data

Jan. 8, 2022    (IN) ............................. 202221001125

(51) Int. Cl.
  *H04N 21/234* (2011.01)
  *H04N 21/854* (2011.01)
(52) U.S. Cl.
  CPC ..... *H04N 21/23424* (2013.01); *H04N 21/854* (2013.01)
(58) Field of Classification Search
  CPC ........... H04N 21/23424; H04N 21/812; H04N 21/854
  See application file for complete search history.

(56) References Cited

U.S. PATENT DOCUMENTS

| | | | | |
|---|---|---|---|---|
| 9,516,378 B1* | 12/2016 | Chen | ................ | H04N 21/44008 |
| 11,785,299 B1* | 10/2023 | Wanjari | ............... | H04N 21/812 |
| | | | | 725/14 |
| 2003/0028873 A1* | 2/2003 | Lemmons | ........ | H04N 21/23418 |
| | | | | 348/588 |
| 2004/0078814 A1* | 4/2004 | Allen | ................. | H04N 21/4781 |
| | | | | 725/135 |
| 2014/0068692 A1* | 3/2014 | Archibong | ......... | H04N 21/6334 |
| | | | | 725/116 |
| 2022/0279248 A1* | 9/2022 | Terrazas | ........... | H04N 21/41265 |

\* cited by examiner

*Primary Examiner* — Rong Le
(74) *Attorney, Agent, or Firm* — FINNEGAN, HENDERSON, FARABOW, GARRETT & DUNNER, LLP

(57) ABSTRACT

The present disclosure provides a robust and effective solution to an entity or an organization by enabling the entity to implement a system for increasing relevance and conversion rate of one or more contents. Further, the system delivers to a plurality of users based on user-specific information feed such as location, data usage pattern, recent searches, duration, activities, and the like. The plurality of contents may include mobile phones, tablets, television, Internet, and the like. The system provides for a personalized, customized, and easy to create one or more contents on a plurality of digital platforms devices used by plurality of users. The users include local shop vendors, dealers, and brands to get their product or shop advertised to the potential target audience and increase the reach and conversion rate of the advertisement.

14 Claims, 7 Drawing Sheets

SYSTEM AND METHOD FOR CUSTOMISATION OF MEDIA INFORMATION

RESERVATION OF RIGHTS

FIELD OF INVENTION

The present disclosure relates generally to the field of computer vision and digital media. More particularly, the present disclosure provides a system and a method for facilitating visual attention to a potential targeted audience, while increasing the effectiveness of an advertisement.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The world of advertisements is evolving with advancements in technology and the nature of audience. With the increase in technology advancements, new platforms have evolved in entertaining users that has reduced the attention time span of the users. Modern marketing has impacted the time, budget, resources, type, and duration of the advertisements (ads). The time involved in creating the ads is still a major concern for many brands. Further, local shop owners cannot afford the budget for making the ads. Furthermore, availability of relevant resources and data is again a crucial point that is required to have effective advertisement and brand marketing for a targeted audience. Contemporary systems and methods provide solutions by automating the entire advertising process. Further, the contemporary systems and methods provide valuable budgets with minimal human intervention and higher return of investment. Additionally, an artificial intelligence (AI) engine optimizes the ads for the targeted audience on multiple channels. As sales and marketing are interconnected, the AI engine autonomously optimizes the marketing campaigns based on customers for a particular business.

Conventional systems and methods are disclosed for dynamically constructing personalized contextual video programs. In particular, the conventional method includes extracting video metadata from a video program, extracting component metadata from video components stored in a media object library, extracting viewer preferences, and receiving synchronization information about the video program. Further, the method includes identifying a video program segment susceptible to inserting a video component, and transmitting the video component to a playback device. Furthermore, the method includes instructions about inserting the video component in the video program segment. A viewer profile can be based on demographic information and user behaviour. The video program and the video component can be combined before transmitting the video component and instructions to the playback device. A video component can be selected based on an advertiser's preference whereas the transmitted video component and instructions can be stored as a construction list for future use.

Another conventional system and method discloses an improved advertising with video ad creatives. The serving of ads with (e.g., on) video documents may be improved by estimating a video advertisement performance using {tag, value} pair keys. Further, the tags may pertain to video advertisements. For example, such estimates may be used in determinations of whether and/or how to serve a candidate video ad.

However, there remains a challenge to retain the attention span of the audience on a digital platform. Additional challenges may be anticipated that may lead to issues in the way information is delivered to the audience. Further, challenges may be observed in the way the audience knows and remembers the product and services in a short span of time.

There is, therefore, a need in the art to provide a system and a method that can mitigate the problems associated with the conventional systems and methods.

OBJECTS OF THE INVENTION

Some of the objects of the present disclosure, which at least one embodiment herein satisfies are as listed herein below.

It is an object of the present disclosure to provide a system and a method that improves attention span and interest of an audience for ads displayed.

It is an object of the present disclosure to provide a system and a method that facilitates a lower cost towards the production of multi-label, multi-brand ads with a single base media.

It is an object of the present disclosure to provide a system and a method that facilitates easy and personalized method for local shops, retailers, brands, etc. to advertise products to potential consumers.

It is an object of the present disclosure to provide a system and a method that reduces the overall time due to the utilization of AI-based content configuration and video generation.

It is an object of the present disclosure to provide a system and a method that improves the audience-to-customer conversion rate.

It is an object of the present disclosure to provide a system and a method that facilitates a dynamic, robust, and a cost-efficient approach.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system that may include one or more processors operatively coupled to one or more computing devices. The one or more processors may be coupled with a memory that stores instructions to be executed by the one or more processors. The one or more processors may be configured to receive one or more input parameters from the one or more computing devices using an information template. The one or more computing devices may be associated with one or more users and may be connected to the processor through a network. The one or more input parameters may be indicative of one or more contents provided by the one or more users through the one or more computing devices. Further, the one or more processors may extract a first set of attributes from the one or more input parameters. The first set of attributes may be indicative of one or more keywords based on the one or more contents. Additionally, the one or more processors may extract a second set of attributes based on the first set of attributes. The second set of attributes may be indicative of one or more categories for the one or more keywords. The one or more processors may extract a third set of attributes based on the second set of attributes, where the third set of attributes may be indicative of one or more priority rankings for the one or more categories. Based on the first set of attributes, the second set of attributes, and the third set of attributes, the one or more processors may generate a predictive model through an artificial intelligence (AI) engine. Further, the processor may generate one or more media information customizations based on the predictive model.

In an embodiment, the one or more techniques used by the AI engine may include one or more text feature extraction techniques and one or more image feature extraction techniques to generate the predictive model.

In an embodiment, the one or more input parameters may include any or a combination of a location, a network strength, a band, a data usage history, a user profile, and a user subscription.

In an embodiment, the one or more keywords generated by the one or more processors may include any or a combination of a name, a brand, and a description for the one or more media information customizations.

In an embodiment, the one or more processors may be configured to generate a template selection, a concept, a credibility, and a potential score for the one or more users based on the one or more categories.

In an embodiment, the one or more processors may be configured to use the potential score for the one or more users and generate the one or more priority rankings based on the potential score.

In an embodiment, the one or more processors may be configured to use one or more post-processing techniques and generate a visual attention based-model through the AI engine for an enhancement of the one or more media information customizations.

In an embodiment, the one or more post-processing techniques used by the one or more processors may include any or a combination of a colour enhancement technique and an advertisement positioning technique for the enhancement of the one or more media information customizations.

In an embodiment, the one or more processors may be configured to generate one or more template cards associated with the visual attention-based model and generate the enhancement of the one or more media information customizations based on the one or more template cards.

In an embodiment, the one or more template cards may include any or a combination of one or more photos, one or more graphics, one or more transitions, and one or more musical elements for the one or more media information customizations.

In an aspect, the present disclosure generally relates to a method for providing one or more media information customizations. The method may include receiving, by one or more processors, one or more input parameters from one or more computing devices using an information template. The one or more computing devices may be associated with one or more users and may be connected to the one or more processors through a network. The one or more input parameters may be indicative of one or more contents provided by the one or more users through the one or more computing devices. The method may include extracting, by the one or more processors, a first set of attributes from the one or more input parameters. The first set of attributes may be indicative of one or more keywords based on the one or more contents. The method may include extracting, by the one or more processors, a second set of attributes based on the first set of attributes. The second set of attributes may be indicative of one or more categories for the one or more keywords. Further, the method may include extracting, by the one or more processors, a third set of attributes based on the second set of attributes. The third set of attributes may be indicative of one or more priority rankings for the one or more categories. The method may include generating, by the one or more processors, based on the first set of attributes, the second set of attributes, and the third set of attributes, a predictive model through an AI engine. The AI engine may be configured to use one or more techniques to generate the predictive model. Further, the method may include generating, by the one or more processors, the one or more media information customizations based on the predictive model.

In an embodiment, the method may include using, by the one or more processors, one or more post-processing techniques. Additionally, the method may include generating, by the one or more processors, a visual attention-based model through the AI engine for an enhancement of the one or more media information customizations.

In an embodiment, the method may include the one or more post processing techniques used by the one or more processors with any or a combination of a colour enhancement and an advertisement positioning for the enhancement of the one or more media information customizations.

In an embodiment, the method may include generating, by the one or more processors, one or more template cards associated with the visual attention-based model. Additionally, the method may include generating, by the one or more processors, the enhancement of the one or more media information customizations.

In an embodiment, the method may include generating, by the one or more processors, one or more template cards associated with the visual attention-based model. Additionally, the method may further include generating, by the one or more processors, the enhancement of the one or more media information customizations based on the one or more template cards.

In an embodiment, the method may include the one or more template cards with any or a combination of one or more photos, one or more graphics, one or more transitions, and one or more musical elements for the one or more media information customizations.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components or circuitry commonly used to implement such components.

Figure 1:
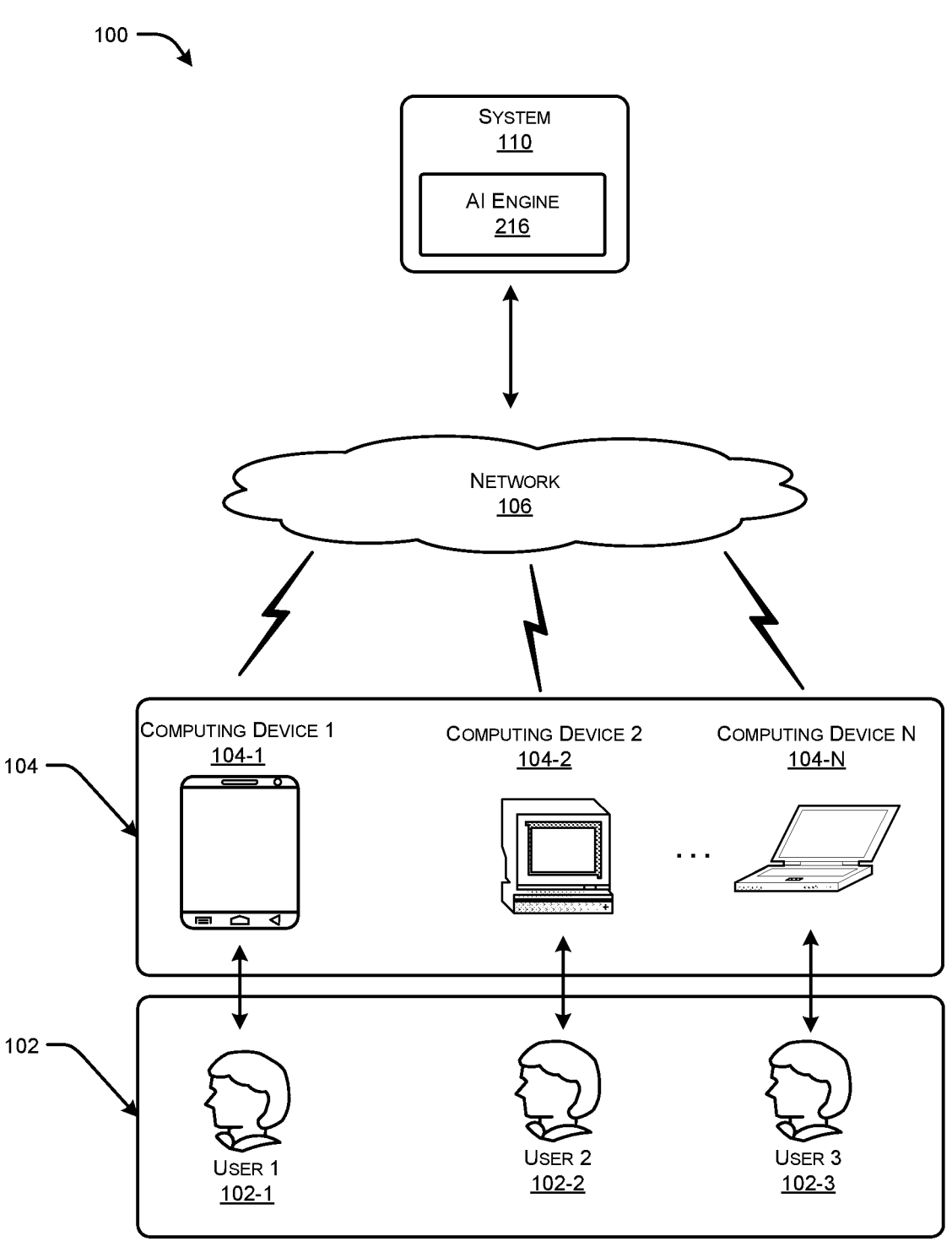
FIG. 1 illustrates an exemplary architecture (100) of a proposed system (110), in accordance with an embodiment of the present disclosure.

The foregoing shall be more apparent from the following more detailed description of the disclosure.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Referring to FIG. 1, exemplary network architecture (100) is illustrated in accordance with an embodiment of the present disclosure. As illustrated in FIG. 1, a plurality of computing devices (104-1, 104-2 . . . 104-N) (herein referred as computing devices (104)) may be connected to a system (110). The computing devices (104) may also be known as a user equipment (UE) that may include, but not be limited to, a mobile, a laptop, etc. Further, the computing devices (104) may include one or more in-built or externally coupled accessories including, but not limited to, a visual aid device such as camera, audio aid, a microphone, a keyboard, input devices for receiving input from a user such as touch pad, touch enabled screen, electronic pen, and the like. It may be appreciated that the computing devices (104) may not be restricted to the mentioned devices and various other devices may be used.

The computing devices (104) may be connected to the system (110) through a network (106). In an exemplary embodiment, the network (106) may include, by way of example but not limitation, at least a portion of one or more networks having one or more nodes that transmit, receive, forward, generate, buffer, store, route, switch, process, or a combination thereof, etc. One or more messages, packets, signals, waves, voltage or current levels, some combination thereof, or so forth may be included by the one or more nodes. The network (106) may include, by way of example but not limitation, one or more of a wireless network, a wired network, an internet, an intranet, a public network, and a private network. Further, the network (106) may include a packet-switched network, a circuit-switched network, an ad hoc network, an infrastructure network, a public-switched telephone network (PSTN), a cable network, a cellular network, a satellite network, a fibre optic network, some combination thereof.

One or more users (102) (herein referred as users (102)) may provide one or more input parameters indicative of one or more contents through the computing devices (104). In an embodiment, the system (110) may include an AI engine (216) for generating a predictive model using one or more techniques. The AI engine (216) may be configured to use one or more techniques and generate one or more media information customizations based on the predictive model. The one or more media customizations may include visual attention-based advertisement enhancement to capture the attention of the users (104).

Figure 2:
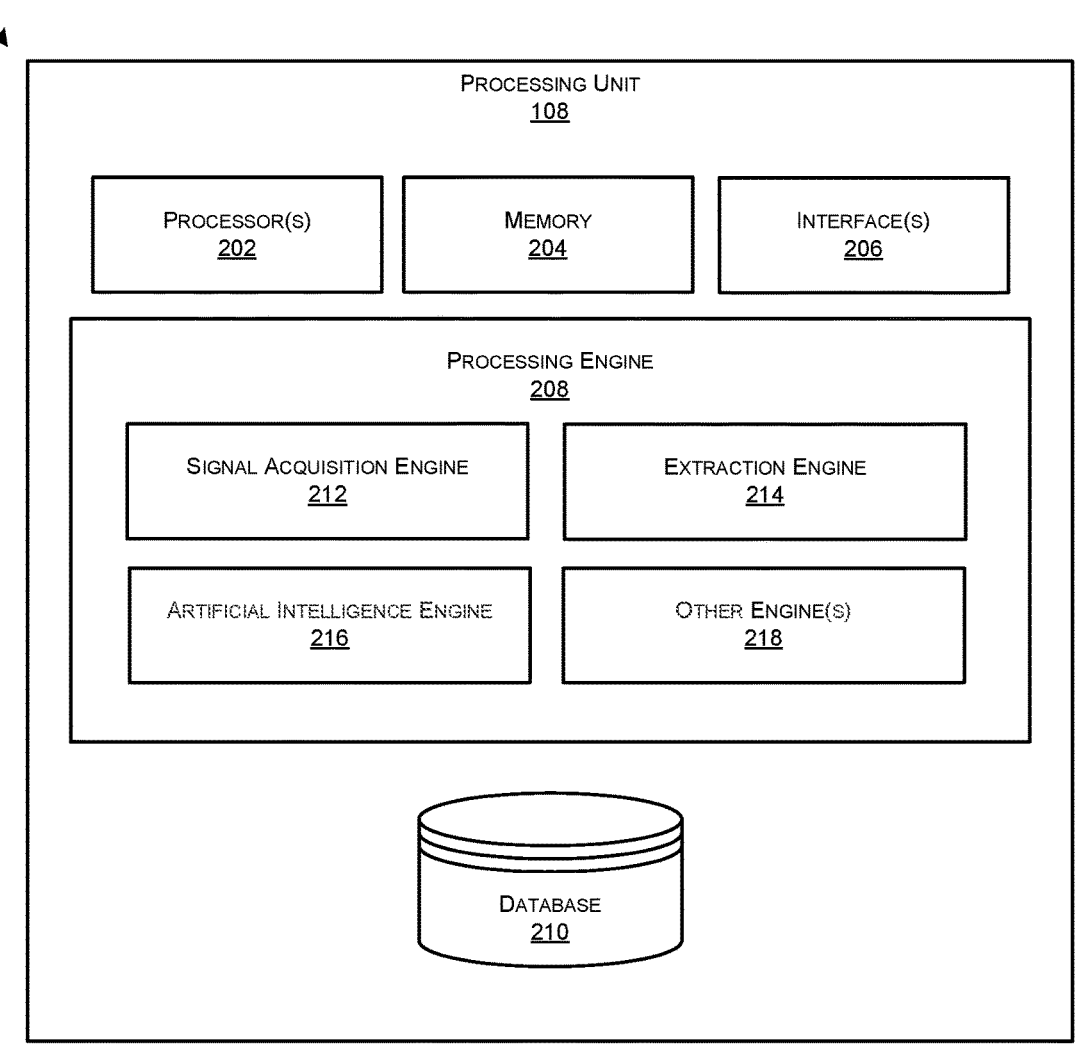
FIG. 2 illustrates an exemplary representation (200) of the proposed system (110), in accordance with an embodiment of the present disclosure.

FIG. 2 illustrates an exemplary representation (200) of the proposed system (110), in accordance with an embodiment of the present disclosure.

Referring to FIG. 2, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as random-access memory (RAM), or non-volatile memory such as erasable programmable read only memory (EPROM), flash memory, and the like.

In an embodiment, the system (110) may include an interface(s) (206). The interface(s) (206) may comprise a variety of interfaces, for example, interfaces for data input and output devices, referred to as input/output (I/O) devices, storage devices, and the like. The interface(s) (206) may facilitate communication for the system (110). The interface(s) (206) may also provide a communication pathway for one or more components of the system (110). Examples of such components include, but are not limited to, processing engine(s) (208) and a database (210).

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor-executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

Referring to FIG. 2, the processing engine(s) (208) may include one or more engines selected from any of a signal acquisition engine (212), an extraction engine (214), an AI engine (216) and other engine(s) (218). In an embodiment, the signal acquisition engine (212) may receive one or more input parameters from computing devices, such as computing devices (104) of FIG. 1 using an information template. The one or more input parameters may be indicative of one or more contents provided by users, such as users (102) of FIG. 1 through the computing devices (104). The one or more input parameters comprise any or a combination of a location, a network strength, a band, a data usage history, a user profile, and a user subscription.

In an embodiment, the extraction engine (214) may extract a first set of attributes from the one or more input parameters and store the first set of attributes in the database (210). The first set of attributes may be indicative of one or more keywords based on the one or more contents. In an embodiment, the one or more keywords may comprise any or a combination of a name, a brand, and a description for one or more media information customizations.

In an embodiment, the extraction engine (214) may extract a second set of attributes based on the first set of attributes and store the second set of attributes in the database (210). The second set of attributes may be indicative of one or more categories for the one or more keywords. In an embodiment, the extraction engine (214) may extract a third set of attributes based on the second set of attributes and store the third set of attributes in the database (210). The third set of attributes may be indicative of one or more priority rankings for the one or more categories. In an embodiment, based on the first set of attributes, the second set of attributes, and the third set of attributes, the one or more processor(s) (202) may generate a predictive model through the AI engine (216) that uses one or more techniques. Additionally, the one or more processor(s) (202) may generate the one or more media information customizations based on the predictive model. Further, the one or more processors (202) may generate a template selection, a concept, a credibility, and a potential score for the users (102) based on the one or more categories.

In an embodiment, the one or more techniques used by the AI engine (216) may comprise one or more text feature extraction techniques and one or more image feature extraction techniques to generate the predictive model. In an embodiment, the AI engine (216) may further include a SMART-AD card (SAC) module (306) to generate advertisement cards through predictive analysis. This predictive analysis may contain information of keywords, keyword's concept, and a priority score that gives a confidence about the ad shown to the users (102).

In an embodiment, the other engine(s) (218) may include an Infocard module, an Ad card generation module, a base media module, and a visual attention-based ad colour enhancement and ad placement module (310).

Figure 3:
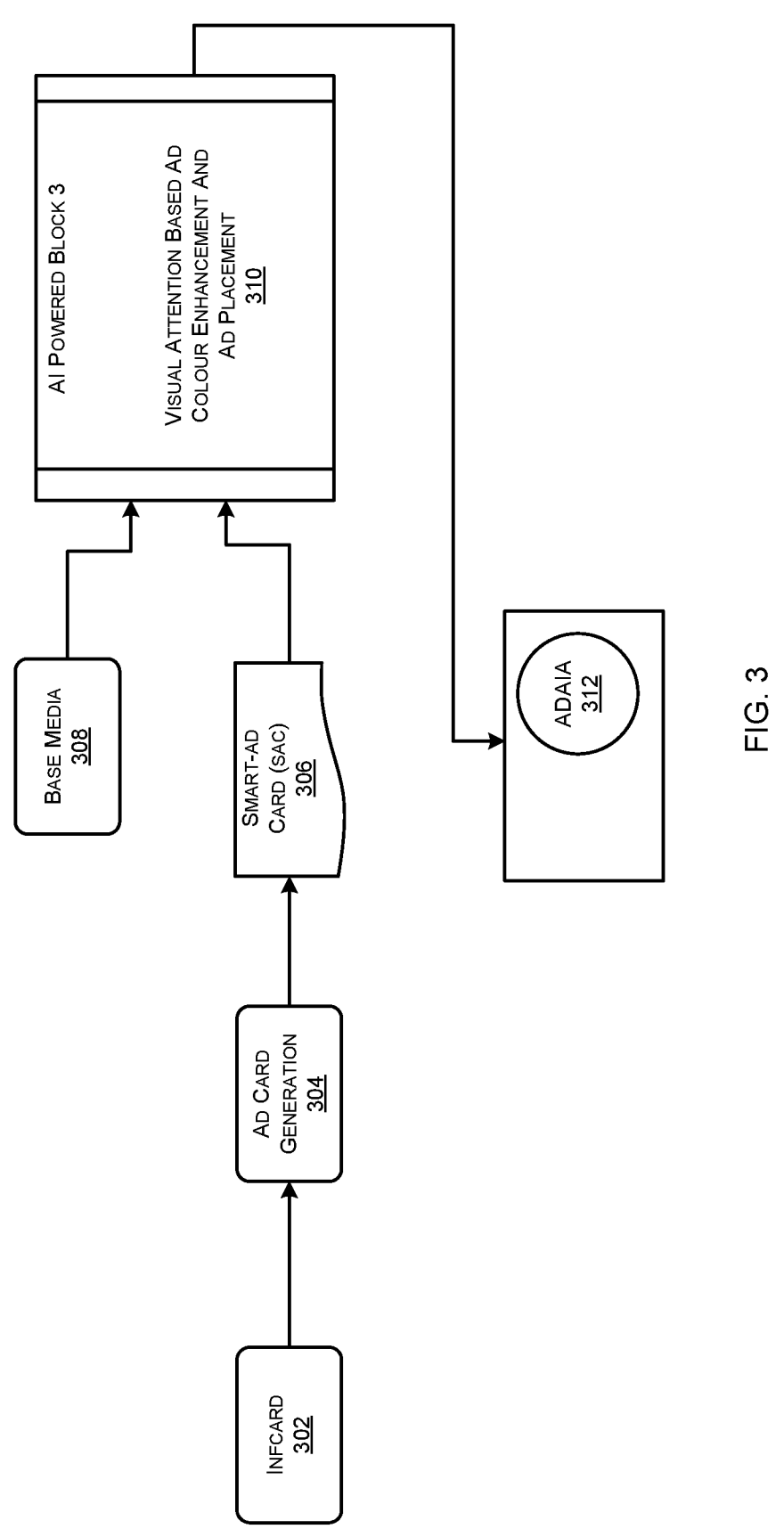
FIG. 3 illustrates an exemplary block diagram representation (300) of the proposed system (110), in accordance with an embodiment of the present disclosure.

FIG. 3 illustrates an exemplary block diagram representation (300) of the proposed system, in accordance with an embodiment of the present disclosure.

As illustrated in FIG. 3, the proposed system may start with an Infocard module (302). The Infocard module (302) may produce information about a potential product, service, item, or the like, based on the information provided by users, such as the users (102) of FIG. 1. This information is further given to an Ad card generation module (304) to produce a Smart-Ad card (SAC). The Smart-Ad card module (306) may provide a modified version of a media template that can be given to map with base media. The SAC (306) can be then mapped with a base media module (308) and a visual attention-based ad colour enhancement and ad placement module (310) to enhance the engagement of the users (102) with an advertisement shown on their respective computing devices (104).

Further, the Infocard module (302) may generate keywords based on the information provided by the users (102). The Ad card generation module (304) may generate a SAC that may be combined with the base media module (308) to provide the input to the visual attention-based AD colour enhancement and AD placement module (310). The visual attention-based AD colour enhancement and placement module (310) may enhance the engagement of the users (102) with the advertisement shown on their respective computing devices (104). Hence, an advertisement power by artificial intelligence (AI) with attention (ADAIA) (312) may be available.

Figure 4A:
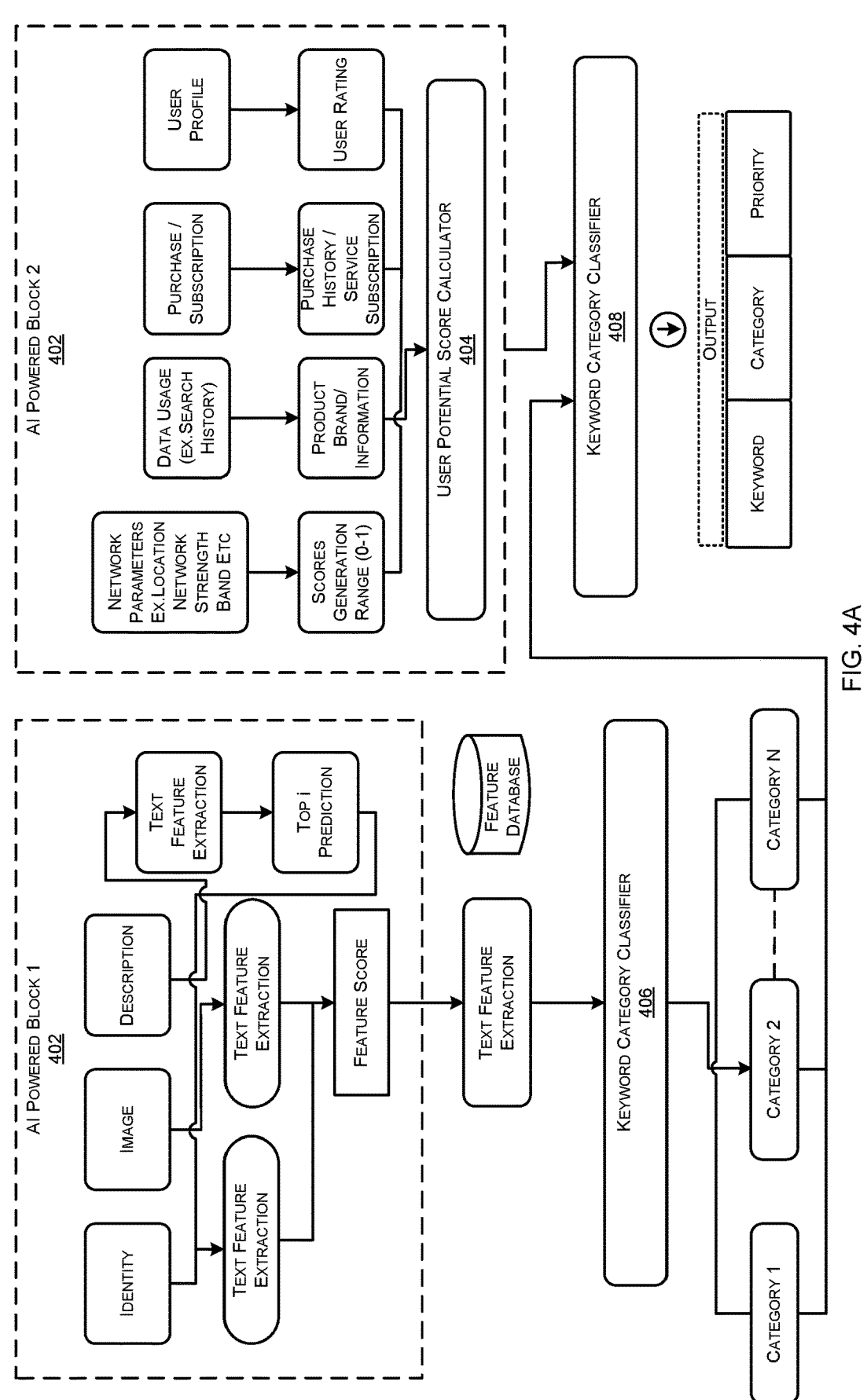
FIGS. 4A-4C illustrate exemplary key components of the proposed system (110), in accordance with an embodiment of the present disclosure.
Figure 4B:
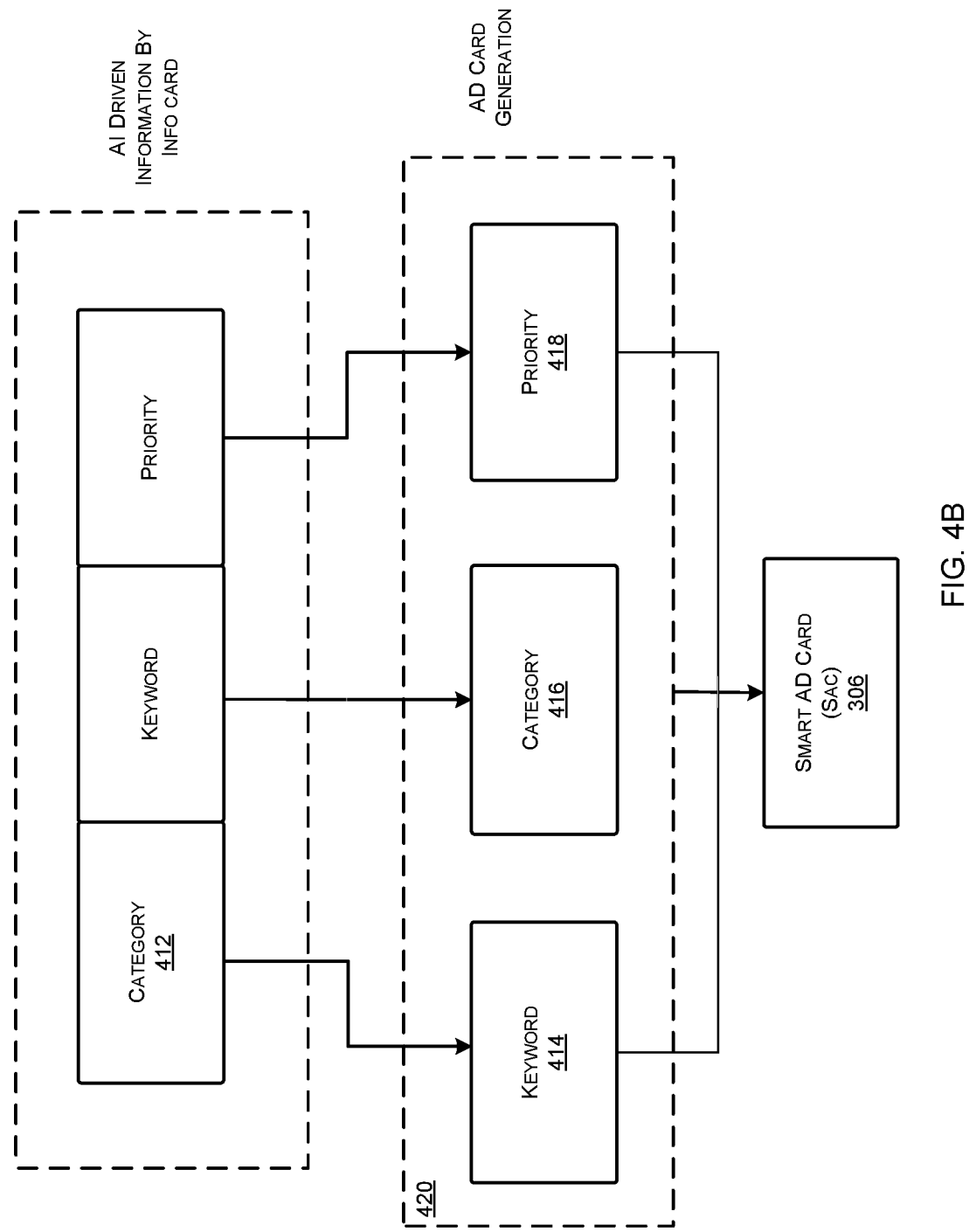
Figure 4C:
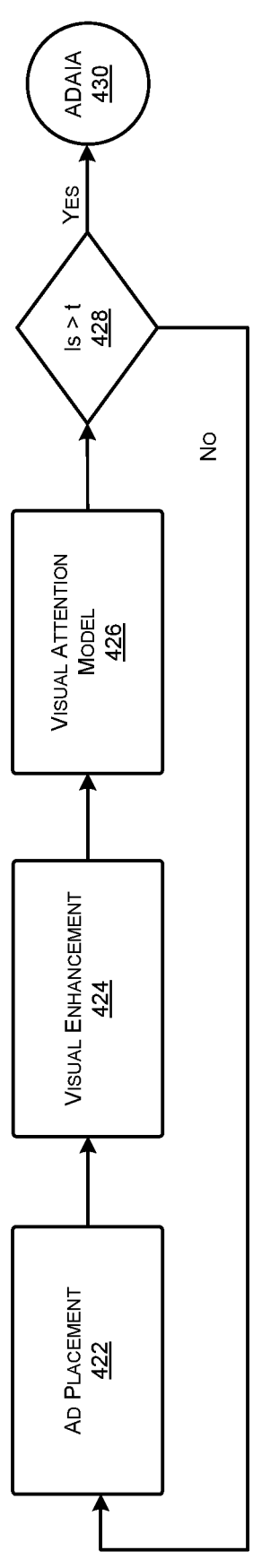

FIGS. 4A-4C illustrate exemplary key components of the proposed system (110), in accordance with an embodiment of the present disclosure. As illustrated, FIG. 4A shows a system architecture of an Infocard module, such as the Infocard module (302) of FIG. 3. In an embodiment, the Infocard module (302) may be responsible for generation of keywords on which an advertisement template-based card is to be generated. Referring to FIG. 4A, the Infocard module (302) may comprise at least two blocks, a first AI-powered block (402) that may focus on the desired set of outcomes from the users (102), and a second AI-powered block (404) that may focus on AI-based recommendations for better and more accurate predictions of user's needs, potential, and willingness to convert the advertisement. The desired block set gives a stack of keywords comprising a set of words and categories as output. The stack of keywords may be provided in the form of top I-ranked items which may be given to further blocks. In an embodiment, the one or more keywords generated may comprise any or a combination of a name, a brand, and a description for one or more media information customizations. In an embodiment, categories may refer to a class with similar feature distribution. All the information may contribute towards providing the one or more keywords along with the credibility of the users (102) and the potential score of the users (102).

FIG. 4B illustrates a SAC module (306) responsible for providing a modified version of a media template that can be given to map with base media. Based on the information provided by an Infocard module (412), a template selection, concept, credibility of the users (102), and potential score of the users (102), an advertisement is generated. The SAC module (306) consists of at least two basic levels, where one takes up information from the Infocard module (412) and gives the information to the next stage for ad generation. Based on category information, the Ad card generation (420), and specifically, the keyword module (414) may choose artifacts that may include photos, music, transition, graphic, and the like. This may be further configured based on the keyword and priority information. This generated template card may be further mapped to the base media to generate a SAC module (306). The category module (416)

may include the template for the keywords, and the priority module (418) may include the credibility for the generated keywords and template.

In an exemplary embodiment, users (102) may be referred to as a shop, brand owners, dealers, etc. and internet consumers may be referred as an audience. A person of ordinary skill in the art will understand that a service provider may be referred as the source for a base video. In an embodiment, the proposed system starts from users (102) who put some basic details required to create custom advertisements like shop name, logo of the shop, any product, offers, new openings, brands, etc. After getting the required information for creating personalised ads, the information is used to determine the type of the advertisement and an AI-based recommendation system is used. In an embodiment, the AI-based recommendation system is used based on the domain of application. After determining the type of the advertisement, templates are selected and configured. Further, audience specific data such as, but not limited to, location, data usage pattern, recent searches, duration, activities, etc. are used to give predictive analysis about targeted audience and a target product or advertiser along with priority score. The audience specific data may also be used to configure the advertisement content to increase information acceptance by the audience, which collaboratively generates the SAC (306).

FIG. 4C illustrates an exemplary block diagram representation of visual attention-based ad colour correction and placement. Post mapping of the with the base media, as discussed above with reference to FIGS. 3, 4A, and 4B, an advertisement is ready. Now, in next stage, the SAC with base media is given for post-processing which may help in enhancing the attention of the users (102) towards the advertisement.

In an embodiment, one or more post-processing techniques may and used to generate a visual attention-based model through an AI engine (216), such as the AI engine (216) of FIG. 2, for an enhancement of one or more media information customizations.

In an embodiment, the one or more post processing techniques may comprise any or a combination of a colour enhancement technique and an ad positioning technique for the enhancement of the one or more media information customizations.

In an exemplary embodiment, an Ad placement module (422) may provide the ad to a visual enhancement module (424) that provides colour correction for the ad. A visual attention-based model (426) may determine the eyeball position of a user on a screen. In an embodiment, colour correction may be performed at the SAC. After this stage, the advertisement is ready for the target audience and target products or services given by brands, shops, distributors, and the like.

In an embodiment, one or more template cards associated with the visual attention-based model may be generated. In an embodiment, enhancement of the one or more media information customizations may be generated based on the one or more template cards. In an embodiment, the one or more template cards may comprise any or a combination of one or more photos, one or more graphics, one or more transitions, and one or more musical elements for the one or more media information customizations.

Further, in an embodiment, t may be a threshold value for a score generated by the visual attention-based model (426). If the score is above the threshold value (428), it will be accepted as an output or else a feedback path may be followed. The add placement and re-colourisation may be performed to improve the ADAIA score (430).

Figure 5:
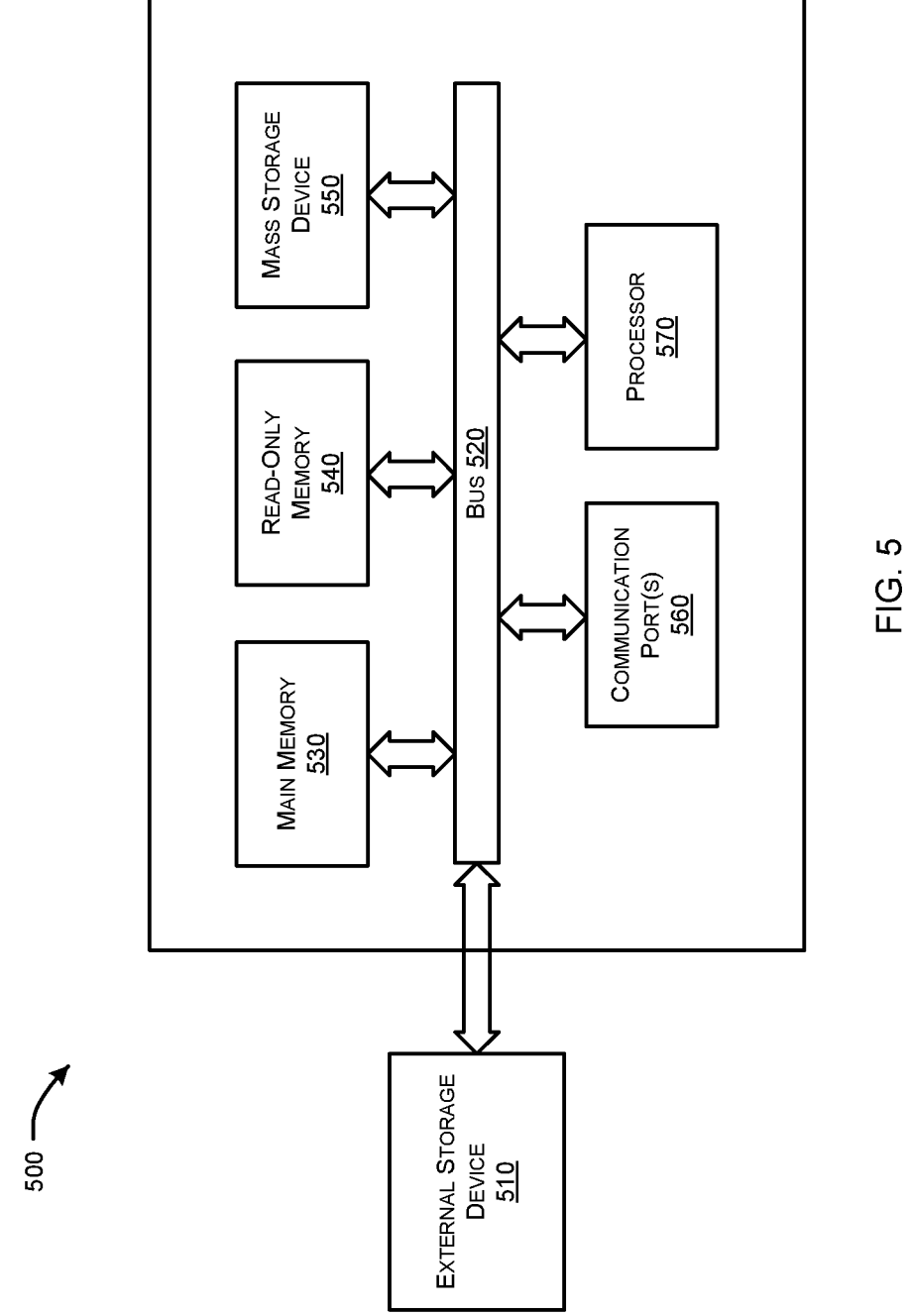
FIG. 5 illustrates an exemplary computer system (500) in which or with which the proposed system (110) may be implemented, in accordance with embodiments of the present disclosure.

FIG. 5 illustrates an exemplary computer system (500) in which or with which the proposed system (110) may be implemented, in accordance with embodiments of the present disclosure. As shown in FIG. 5, the computer system (500) may include an external storage device (510), a bus (520), a main memory (530), a read-only memory (540), a mass storage device (550), communication port(s) (560), and a processor (570). A person skilled in the art will appreciate that the computer system (500) may include more than one processor and communication port. The processor (570) may include various modules associated with embodiments of the present disclosure. The communication port(s) (560) may be any of an RS-252 port for use with a modem-based dialup connection, a 10/100 Ethernet port, a Gigabit or 10 Gigabit port using copper or fiber, a serial port, a parallel port, or other existing or future ports. The communication port(s) (560) may be chosen depending on a network, such a Local Area Network (LAN), Wide Area Network (WAN), or any network to which the computer system (500) connects. The main memory (530) may be a Random-Access Memory (RAM), or any other dynamic storage device commonly known in the art. The read-only memory (540) may be any static storage device(s) e.g., but not limited to, a Programmable Read Only Memory (PROM) chips for storing static information e.g., start-up or basic input/output system (BIOS) instructions for the processor (570). The mass storage device (550) may be any current or future mass storage solutions, which can be used to store information and/or instructions.

The bus (520) may communicatively couple the processor(s) (570) with the other memory, storage, and communication blocks. The bus (520) may be, e.g., a Peripheral Component Interconnect (PCI)/PCI Extended (PCI-X) bus, Small Computer System Interface (SCSI), universal serial bus (USB) or the like. The bus (520) may further include connecting expansion cards, drives, and other subsystems as well as other buses, such a front side bus (FSB), which connects the processor (570) to the computer system (500).

Optionally, operator and administrative interfaces, e.g. a display, keyboard, and a cursor control device, may also be coupled to the bus (520) to support direct operator interaction with the computer system (500). Other operator and administrative interfaces may be provided through network connections connected through the communication port(s) (560). Components described above are meant only to exemplify various possibilities. In no way should the aforementioned exemplary computer system (500) limit the scope of the present disclosure.

Thus, the present disclosure provides for a unique and efficient system to provide keywords, description, and priority ranking based on user-specific information and recommendations. The system can be AI-triggered and modified advertisement content—Artificial Intelligence algorithms/methods that cover deep-learning, machine learning, reinforcement learning, or any other domain which is part of AI and can be used for predictive analysis. The predictive analysis may be based on the type of data being used, type of advertisement, and targeted audience. The system may further facilitate visual attention-based colour correction for improving enhancing attention of the audience.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter to be implemented merely as illustrative of the disclosure and not as limitation.

Advantages of the Invention

The present disclosure provides a system that improves the attention span and interest of the audience for the advertisement displayed.

The present disclosure provides a system and a method that facilitates a lower cost towards the production of multi-label, multi-brand ads with a single base media.

The present disclosure provides a system and a method that facilitates easy and personalized method for local shops, retailers, brands, etc. to advertise their products to potential consumers.

The present disclosure provides a system and a method that reduces the overall time due to the utilization of AI-based content configuration and video generation.

The present disclosure provides a system and a method that improves the audience-to-customer conversion rate.

The present disclosure provides a system and a method that facilitates a dynamic, robust, and a cost-efficient approach.

We claim:

1. A system for providing one or more media information customizations, said system comprising:

one or more processors operatively coupled to one or more computing devices, the one or more processors coupled with a memory, wherein said memory stores instructions which when executed by the one or more processors causes the one or more processors to:

receive one or more input parameters from the one or more computing devices using an information template, wherein the one or more computing devices are associated with one or more users and are connected to the one or more processors through a network, and wherein the one or more input parameters are indicative of one or more contents provided by the one or more users through the one or more computing devices;

extract a first set of attributes from the one or more input parameters, wherein the first set of attributes are indicative of one or more keywords based on the one or more contents;

extract a second set of attributes based on the first set of attributes, wherein the second set of attributes are indicative of one or more categories for the one or more keywords;

extract a third set of attributes based on the second set of attributes, wherein the third set of attributes are indicative of one or more priority rankings for the one or more categories;

based on the first set of attributes, the second set of attributes, and the third set of attributes, generate a predictive model through an artificial intelligence (AI) engine, wherein the AI engine is configured to use one or more techniques;

generate the one or more media information customizations based on the generated predictive model, wherein the generation of the one or more media information customizations comprises mapping of a media template representing one or more template cards to a base media; and provide the media template mapped with the base media to a module, wherein the module applies one or more post-processing techniques to generate a visual attention-based model to enhance the one or more media information customizations, wherein the visual attention-based model determines the eyeball position of a user on a screen, wherein the one or more processors are configured to generate a score by the visual attention-based model for the enhanced one or more media information customizations, wherein the one or more processors are configured to accept the enhanced one or more media information customizations as an output upon a determination that the generated score exceeds a threshold value, and wherein the one or more processors are configured to subject the enhanced one or more media information customizations to a feedback path for re-applying the one or more post-processing techniques upon a determination that the generated score does not exceed a threshold value.

2. The system as claimed in claim 1, wherein the one or more techniques used by the AI engine comprise one or more text feature extraction techniques and one or more image feature extraction techniques to generate the predictive model.

3. The system as claimed in claim 1, wherein the one or more input parameters comprise any one or a combination of a location, a network strength, a band, a data usage history, a user profile, and a user subscription.

4. The system as claimed in claim 1, wherein the one or more keywords generated by the one or more processors comprise any one or a combination of a name, a brand, and a description for the one or more media information customizations.

5. The system as claimed in claim 1, wherein the one or more processors are configured to generate a template selection, a concept, a credibility, and a potential score for the one or more users based on the one or more categories.

6. The system as claimed in claim 5, wherein the one or more processors are configured to use the potential score for the one or more users and generate the one or more priority rankings based on the potential score.

7. The system as claimed in claim 1, wherein the one or more post-processing techniques used by the one or more processors comprise any one or a combination of a colour enhancement technique and an advertisement positioning technique for the enhancement of the one or more media information customizations.

8. The system as claimed in claim 1, wherein the one or more processors are configured to generate the one or more template cards associated with the visual attention-based model, and generate the enhancement of the one or more media information customizations based on the one or more template cards.

9. The system as claimed in claim 8, wherein the one or more template cards comprise any one or a combination of one or more photos, one or more graphics, one or more transitions, and one or more musical elements for the one or more media information customizations.

10. A method for providing one or more media information customizations, said method comprising:

receiving, by one or more processors, one or more input parameters from one or more computing devices using an information template, wherein the one or more input parameters are indicative of one or more contents provided by one or more users through the one or more computing devices;

extracting, by the one or more processors, a first set of attributes from the one or more input parameters, wherein the first set of attributes are indicative of one or more keywords based on the one or more contents;

extracting, by the one or more processors, a second set of attributes based on the first set of attributes, wherein the second set of attributes are indicative of one or more categories for the one or more keywords;

extracting, by the one or more processors, a third set of attributes based on the second set of attributes, wherein the third set of attributes are indicative of one or more priority rankings for the one or more categories;

generating, by the one or more processors, based on the first set of attributes, the second set of attributes, and the third set of attributes, a predictive model through an artificial intelligence (AI) engine, wherein the AI engine is configured to use one or more techniques;

generating, by the one or more processors, the one or more media information customizations based on the predictive model, wherein generating the one or more media information customizations comprises mapping a media template representing one or more template cards to a base media;

providing, by the one or more processors, the media template mapped with the base media to a module, wherein the module applies one or more post-processing techniques to generate a visual attention-based model to enhance the one or more media information customizations, wherein the visual attention-based model determines the eyeball position of a user on a screen, generating, by the one or more processors, a score by the visual attention-based model for the enhanced one or more media information customizations;

accepting, by the one or more processors, the enhanced one or more media information customizations as an output upon a determination that the generated score exceeds a threshold value; and following, by the one or more processors, a feedback path for the enhanced one or more media information for re-applying the one or more post-processing techniques upon a determination that the generated score does not exceed a threshold value.

11. The method as claimed in claim 10, wherein the one or more post-processing techniques used by the one or more processors comprise any one or a combination of a colour enhancement and an advertisement positioning for the enhancement of the one or more media information customizations.

12. The method as claimed in claim 10, comprising, generating by the one or more processors, the one or more template cards associated with the visual attention based-model, and generating the enhancement of the one or more media information customizations based on the one or more template cards.

13. The method as claimed in claim 12, wherein the one or more template cards comprise any or a combination of one or more photos, one or more graphics, one or more transitions, and one or more musical elements for the one or more media information customizations.

14. A user equipment (UE) for providing one or more media information customizations, said UE comprising:

one or more processors communicatively coupled to one or more processors comprised in a system, the one or more processors coupled with a memory, wherein said memory stores instructions which when executed by the one or more processors causes the UE to:

transmit one or more input parameters to the one or more processors using an information template, wherein the UE is associated with one or more users and is connected to the one or more processors through a network;

wherein the one or more processors are configured to:

receive the one or more input parameters from the UE using the information template, wherein the one or more input parameters are indicative of one or more contents provided by the one or more users through the UE;

extract a first set of attributes from the one or more input parameters, wherein the first set of attributes are indicative of one or more keywords based on the one or more contents;

extract a second set of attributes based on the first set of attributes, wherein the second set of attributes are indicative of one or more categories for the one or more keywords;

extract a third set of attributes based on the second set of attributes, wherein the third set of attributes are indicative of one or more priority rankings for the one or more categories;

based on the first set of attributes, the second set of attributes, and the third set of attributes, generate a predictive model through an artificial intelligence (AI) engine, wherein the AI engine is configured to use one or more techniques;

generate the one or more media information customizations based on the generated predictive model, wherein the generation of the one or more media information customizations comprises mapping of a media template representing one or more template cards to a base media;

provide the media template mapped with the base media to a module, wherein the module applies one or more post-processing techniques to generate a visual attention-based model to enhance the one or more media information customizations, wherein the visual attention-based model determines the eyeball position of a user on a screen, generate a score by the visual attention-based model for the enhanced one or more media information customizations;

accept the enhanced one or more media information customizations as an output upon a determination that the generated score exceeds a threshold value; and follow a feedback path for the enhanced one or more media information for re-applying the one or more post-processing techniques upon a determination that the generated score does not exceed a threshold value.

* * * * *